J. H. SPANGLER.
WHEEL.
APPLICATION FILED FEB. 19, 1917.

1,264,988.

Patented May 7, 1918.
2 SHEETS—SHEET 1.

WITNESSES:
B. Hall
G. E. Sorensen

INVENTOR:
JOHN H. SPANGLER
BY
Paul & Paul
ATTORNEYS.

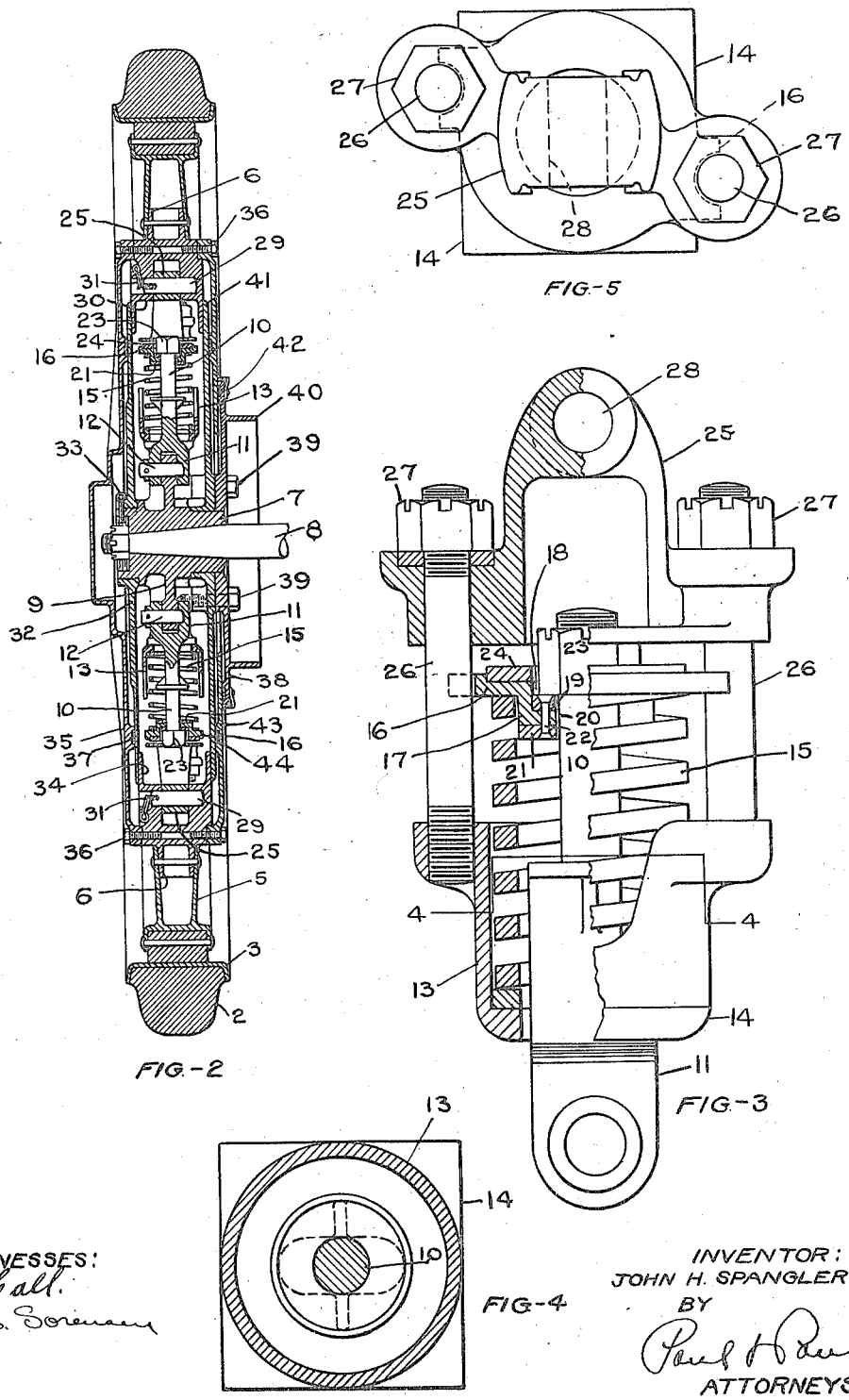

UNITED STATES PATENT OFFICE.

JOHN H. SPANGLER, OF MINNEAPOLIS, MINNESOTA, ASSIGNOR, BY DIRECT AND MESNE ASSIGNMENTS, OF TEN-THIRTIETHS TO OTTO I. KJORLIEN AND ONE-FIFTH TO GEORGIE KLEOPFER, BOTH OF MINNEAPOLIS, MINNESOTA.

WHEEL.

1,264,988.      Specification of Letters Patent.      Patented May 7, 1918.

Application filed February 19, 1917. Serial No. 149,620.

*To all whom it may concern:*

Be it known that I, JOHN H. SPANGLER, a citizen of the United States, resident of Minneapolis, county of Hennepin, State of Minnesota, have invented certain new and useful Improvements in Wheels, of which the following is a specification.

My invention relates to vehicle wheels and particularly to that class generally referred to as "spring" wheels for pleasure vehicles, particularly such as automobiles, and the object of my invention is to provide a wheel having a non-puncturing tread which will carry the load of the vehicle without jarring or jolting the occupants.

A further object is to provide a spring wheel in which all the springs on each side of the hub, as well as above and below it, will be under tension so that the load will be evenly distributed and when the hub is relieved of its load, it will automatically center itself in the wheel.

A further object is to provide a spring wheel in which all the springs are partially tensioned when put in the wheel, thereby eliminating all danger of rattling when the wheel is in use.

A further object is to provide a wheel of comparatively simple construction, one in which the parts are all easily accessible and which can be easily kept free from dust and dirt.

Other objects of the invention will appear from the following detailed description.

Figure 1:
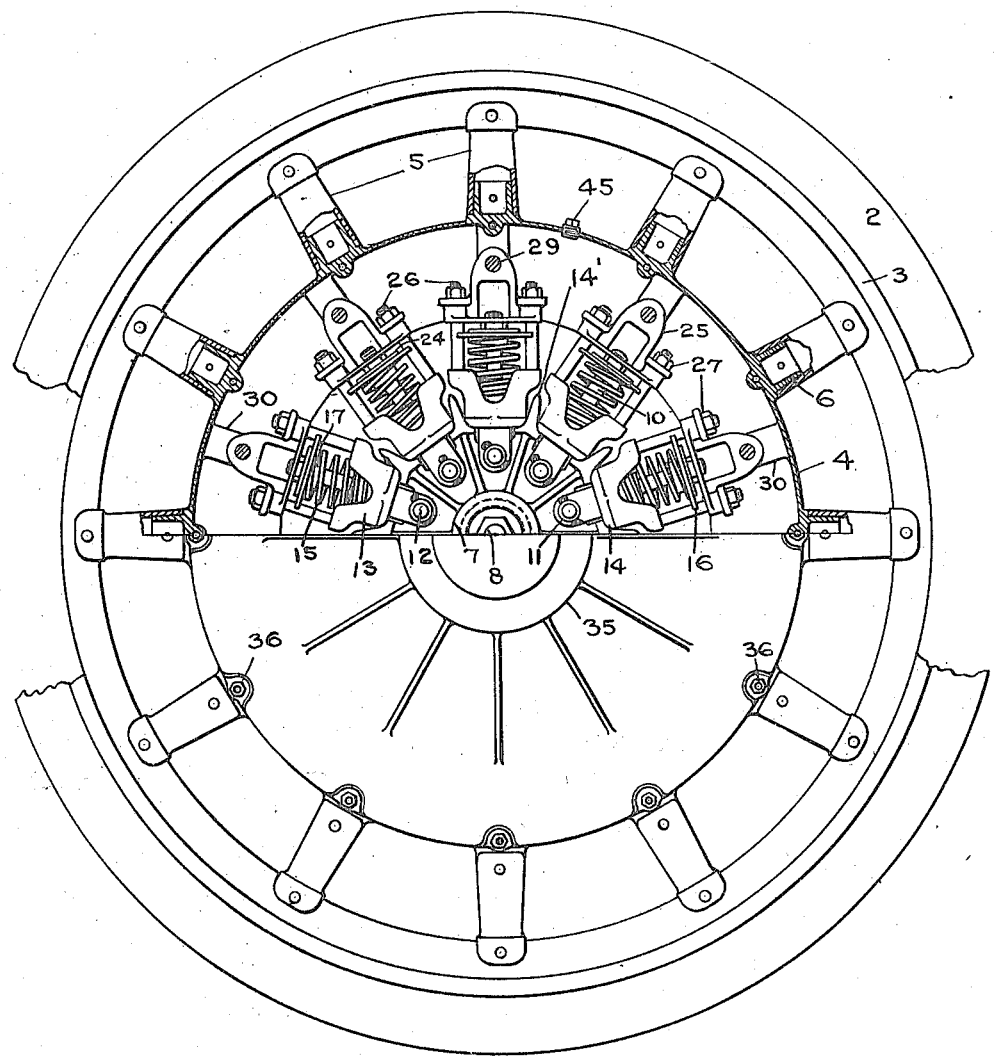
Figure 6:
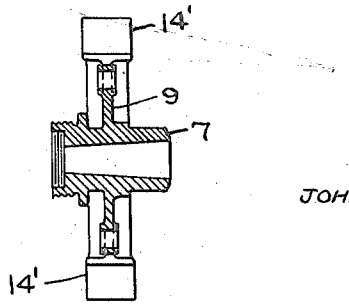

In the accompanying drawings forming part of this specification,

Figure 1 is a side view, partially in section, of a vehicle wheel embodying my invention, Fig. 2 is a transverse sectional view through the wheel, Fig. 3 is a detail sectional view, showing the manner of contacting the hub of the wheel with the encircling rim, Fig. 4 is a sectional view on the line 4—4 of Fig. 3, Fig. 5 is a top plan view of the connection shown in Fig. 3, Fig. 6 is a detail sectional view of the hub.

In the drawing, 2 represents a tire, made preferably of hard rubber or any other suitable composition and mounted in the rim 3 in any suitable manner. 4 is a supplemental rim arranged within and uniformly spaced from the rim 3 and rigidly connected therewith by a series of spokes 5 having their inner ends riveted to projections 6 on the inner rim and their outer ends correspondingly secured to the rim proper. 7 represents the wheel hub and 8 a spindle whereon the said hub is mounted. The hub is provided with an annular web 9 and a series of bolts 10 have forked inner ends 11 which straddle the web 9 and are secured thereto by pins 12 which form a pivotal connection between the bolts and the hub and allow freedom of oscillation of the bolts in the plane of the wheel.

A cup-shaped housing 13 is loosely mounted on the inner end of each bolt and has a rounded surface 14 that is seated upon the corresponding surfaces of projections or lugs 14' which radiate from the web 9, the housings rocking on these projections to accommodate themselves to the positions of the bolts. The projections 14', interposed between the housings and extending entirely around the hub, operate as guides for the housings to return them to their seats when the springs are relieved of tension. These guides are of sufficient length to hold the housings in place under any compression to which the springs may be subjected.

Within the housings are helical springs 15 encircling the bolts 10. Rings 16 are provided, having annular flanges 17 encircling the openings 18 in said rings, said flanges having seats for washers 19 which encircle holes 20 through which the bolts 10 are inserted. Washers 21 are provided on said flanges on the opposite sides thereof from the washers 10 and said washers are secured together by rivets 22. The openings in the rings are of sufficient size to receive nuts 23 of the bolts which are seated against the flange 19 and washers 24 encircle the nuts 23 and are seated in the rings 16. Yokes 25 have bolts 26 provided with adjusting nuts 27 and are tapped into the housings 13, adjustment of the nuts 27 increasing or decreasing the normal tension of the springs 15. The yokes 25 have holes 28 therein to receive pins 29 which pass through inwardly projecting lugs 30 on the rim 4.

The pull of the hub on the bolts above it will operate to compress the springs 15 seated in the bottoms of the housings, but the housings, held by the bolts 26 and their connections with the wheel rim, will not be affected by said downward movement of the hub, but will be seated loosely between the projections thereon, the openings for the bolts in the housings being of sufficient size to allow lateral oscillation without binding or cramping the connections. On the underside of the hub the pressure of the housing seats thereon will force them downwardly with the hub, the bolts 26 sliding in the yokes 25 until the washers 24 contact with the yokes, the bolts 10 sliding freely into the recesses in the yokes. During this movement the springs 15 will be put under compression to yieldingly resist movement of the hub.

The hub will be cushioned both on its downward movement and its rebound, automatically centering itself in the wheel when relieved of its load, and the bolts being free to tilt in the plane of the wheel, all of the springs will be tensioned more or less when pressure is applied to the hub. This tension of the springs will vary with their position in the wheel, but the springs on each side of the hub center will be put under tension during its movement, as well as those above and below the hub, the bolts on which the springs are mounted swinging and accommodating themselves to the different positions of the hub. The springs are all put under tension to a certain degree when mounted in the wheel and consequently will not be idle at any time and cannot rattle or shake in their bearings on the bolts.

The pins 29, provided for connecting the yokes 25 to the rim, are held in place by suitable means, preferably keys 31.

For the purpose of excluding dust and dirt from the interior of the wheel I prefer to provide a disk 32 having a threaded connection with the outer end of the hub 7 and locked thereon by suitable means, such as a cotter pin 33. This disk bears on a flange 34 provided on the rim 4 and is free to slide thereon, and a cover plate 35 is secured by bolts 36 to said rim and has a suitable packing at 37 for contact with the disk 32, excluding dust and dirt at this point. The cover plate 35 operates to conceal the outer face of the wheel and the hub.

On the other side of the wheel a plate 38 is secured to the hub by suitable means, such as bolts 39, and provided with a brake band 40 and a flattened ring 41 is secured to the rim 9 by bolts corresponding to the bolts 39 and has a dust proof joint 42 between it and the plate 38 and the hub is also provided with a disk 43 having a sliding bearing on a flange corresponding to the flange 34 but on the opposite side of the rim for allowing the hub to move vertically and position itself to the load thereon. A dust proof joint 44 is provided between the disk 43 and the ring 41.

It will be noted in Fig. 5 that the yoke 25 is arranged diagonally of the wheel, the yoke of one bolt being staggered slightly with respect to the corresponding yoke of the adjacent bolt. The purpose of this is to provide clearance for these yokes during the oscillation of the bolts when the wheel is under a load, their angular position permitting one yoke to lap by the adjacent one sufficiently to prevent contact between them.

I prefer to provide a plug 45 in the rim 4 for closing a hole therein through which a heavy oil or other suitable lubricating material may be inserted into the spring and bolt chamber of the wheel.

In the operation of the wheel, a load applied to the hub will put the springs above and below it and on each side under compression, those above the hub being compressed between the bottom of their housings and the nuts of the bolts 10, the rings 16 being guided in such movement by the bolts 26. On the underside of the wheel the pressure of the springs will be in the opposite direction, the bolts and the housings being forced downwardly until the washers 24 contact with the yokes 25, when compression of the springs will take place to resist downward movement of the hub. The bolts on each side of the hub, tilting in the plane of the wheel to accommodate themselves to its different positions, will prevent cramping or binding and their springs will, in a similar manner, be tensioned to resist the hub movement. Thus the strain on the hub will be distributed throughout the wheel, every spring sustaining a portion of the load, according to its position in the wheel, and when the hub is relieved, all of the springs will be relieved of compression and the hub will automatically center itself in the wheel.

I claim as my invention:

1. A wheel comprising a rim, a hub therefor having projections radiating therefrom with seats between said projections, bolts pivotally connected with said hub between said projections, springs encircling said bolts, housings seated between said projections and having freedom of radial movement with respect to said hub and projections, and means connecting said housings with said rim.

2. A wheel comprising a rim, a hub therefor, yokes having a pivotal connection with said rim, bolts pivotally connected at one end with said hub, housings seated on said hub and slidably connected with said yokes, helical springs encircling said bolts between said housings and said yokes, inward movement of said bolts compressing said springs against the bottom of said housings, and outward movement of said bolts compressing said springs between said housings and said yoke.

3. A wheel comprising a rim, a hub therein, yokes pivotally connected with said rim, housings seated on said hub, bolts slidably connecting said housings with said yokes, bolts pivotally connected at one end with said hub and fitting loosely within said housings and having outer ends slidable in said yokes, rings carried by said hub bolts, helical springs encircling said hub bolts between said rings and the bottoms of said housings, all of said springs being tensioned to a greater or less degree both during downward and upward movement of said hub.

4. A wheel comprising a rim and tire therefor, a supplemental rim encircled by said first named rim and rigidly connected therewith, a hub within said supplemental rim, bolts pivotally connected with said hub, housings having holes in which said bolts are loosely fitted, the inner ends of said housings being loosely seated on said hub for freedom of movement to accommodate themselves to the position of said arm, helical springs encircling said bolts and seated in said housings, means connecting said housings with said supplemental rim, said springs yieldingly resisting the movement of said hub in the plane of said wheel.

5. A wheel comprising a rim, a hub therefor, housings seated on said hub, bolts loosely fitting within said housings and pivotally connected with said hub, yokes pivotally connected with said rim and having means for connection with said housings, helical springs arranged within said housings and encircling said bolts and put under compression by the upward or downward movement of said hub, each yoke being in staggered relation with respect to the adjacent yoke, whereby contact thereof during compression of said springs and the rocking of said bolts will be prevented.

6. A wheel comprising a rim, a hub therein having an annular web, bolts having forked inner ends straddling said web and pivotally connected therewith, said web having peripheral seats formed thereon, housings fitting said seats and having holes in which said bolts are loosely mounted, helical springs seated in said housings at one end and having means at their opposite ends for engaging with said bolts for placing said springs under compression during the movement of said bolts in one direction, and means connecting said housings with said rim and in the path of said springs for placing them under compression during the movement of said bolts in the opposite direction.

7. A wheel comprising a rim, a hub encircled thereby, couplings pivotally connected with said hub and with said rim, said couplings including housings loosely seated on the periphery of said hub and spring members mounted for compression in any position above, below or at one side of said hub when the load is applied thereto.

8. A wheel comprising a rim, a hub therefor having a plurality of peripheral recesses with projections between them, housings having rounded inner ends loosely seated in said recesses between said projections and being free to rock in said recesses, bolts loosely fitting within said housings and pivotally connected with said hub, yokes pivotally connected with said rim and having bolts for connection with said housings, helical springs arranged within said housings and encircling said first named bolts and put under compression by the upward and downward movement of said hub, said bolts having means at their outer ends on which said springs are seated, and said springs being compressed by the pull on said bolts in one direction and by the outward movement of said housings in the other direction.

In witness whereof, I have hereunto set my hand this 9th day of February, 1917.

JOHN H. SPANGLER.

Copies of this patent may be obtained for five cents each, by addressing the "Commissioner of Patents, Washington, D. C."